Sept. 28, 1965 R. LITTE 3,209,346

OPTICAL SHAFT ENCODER

Filed Feb. 13, 1962 2 Sheets-Sheet 1

INVENTOR.
RUDOLPH LITTE
BY
Weingarten, Orenbuch & Pandiscio
ATTORNEYS

INVENTOR.
RUDOLPH LITTE
BY
Weingarten, Orenbuch & Pandiscio
ATTORNEYS

United States Patent Office 3,209,346
Patented Sept. 28, 1965

3,209,346
OPTICAL SHAFT ENCODER
Rudolph Litte, Lincoln, Mass., assignor to Wayne-George Corporation, Newton, Mass., a corporation of Massachusetts
Filed Feb. 13, 1962, Ser. No. 172,998
2 Claims. (Cl. 340—347)

This invention relates to direct reading shaft angle encoders and more particularly to high accuracy optical shaft angle encoders which permit direct angle-to-digital conversion.

The fundamental requirement of direct angle-to-digital conversion is a means of recognizing in digital form the angular position of a rotating member. The obvious solution, and the one which has been most frequently employed, is to attach or couple to the rotating member a coded element which provides at each angular position, to a given accuracy and resolution, a digital representation of that angular position and to fix to a stationary reference surface a sensing device which will read the digital representation. Perhaps the most common kind of device for providing a digital representation of the angular position of a rotating member is an optical encoder. Essentially, a direct reading optical encoder comprises a glass disc which is coded by concentric arrays of opaque and transparent code elements with the number of code elements in successive tracks differing by a factor of 2, means for rotating the glass disc in synchronism with the rotating member whose angular position is to be determined, a light source to illuminate a radius of the coded disc, a passive optical system to provide collimation and reduce light scatter, a photosensitive detector assembly to detect presence or absence of illumination at the given radius of the coded disc, and amplifier means for providing high level output signals in response to the illumination detected by the detector assembly. Generally, the source of illumination is a flash lamp which flashes in response to a command signal whenever an angular position readout is desired. Bundles of light transmitted through transparent segments of the code disc are collected by the optical system before becoming incident upon the photosensitive detector assembly which provides as an electrical output a digital word representing the code pattern lying within the light path at the instant of lamp discharge. The resolution capability of a direct reading optical encoder is dependent upon the number of concentric binary code tracks on the disc, i.e., the number of digits in the multi-digit binary output. However, the resolution is limited by the minimum size of a discrete code element which can be recognized reliably by a photoelectric detector. The accuracy of an optical shaft encoder cannot exceed plus or minus one-half a binary digit which is the quantizing error inherent in all digital systems and stems from the fact that the information obtained from such encoders does not disclose which part of a least significant code element is being observed. Moreover, depending upon code disc diameter (which, as a practical matter, will vary with the number of code tracks required), inaccuracy in alignment and the like usually contribute an additional plus or minus one-half bit of error. As a consequence, encoders designed for resolution in the order of two minutes of arc or better, i.e., in the order of thirteen or more digits, generally are rated at an accuracy of plus or minus one least significant bit. If the code disc diameters are very large, e.g., on the order of twelve inches or more, the code discs will tend to suffer from additional inaccuracies which result from mechanical instability of the code wheels due primarily to temperature, vibration, and shock. Accuracy of the order of plus or minus one least significant bit is not easily attained with code discs which are designed to give a resolution of two minutes of arc or better, and spoilage, plus the greater precision and care which is involved in meeting specifications, results in a relatively high cost for the code disc. As a matter of fact, the cost of a high resolution code disc may be sufficiently great as to almost equal the total cost of the other components (including amplifiers) of an encoder.

Accordingly, the primary object of the present invention is to provide a direct reading, high resolution encoder at substantially less cost and with greater ease than has been possible heretofore. The primary object of the present invention is accomplished by providing some of the code tracks on the rotating disc and some of the code tracks on an associated code stator, both the disc and the stator being disposed between a source of illumination and a plurality of photodetectors and having associated slits such that the code tracks of the disc are read through a registered slit in the stator and the code tracks in the stator are read through one of several registrable slits in the disc. The present invention is based on the premise that the greater the number of bits in a binary code track, the more likely is the commission of an error or the occurrence of a defect in the code track and the more difficult it is to correct the error and eliminate the defect. The validity of this premise becomes immediately apparent when it is observed that with a Gray code the code track for the twelfth binary digit has 2,048 code bits (or 1,024 discrete transparent code segments); the 13th has 4,096 code bits, the 14th has 8,192 code bits, the 15th has 16,384 code bits, the 16th has 32,768 code bits, and the 17th has 65,536 code bits. Up to about the twelfth code track, uniformity of code bit size and spacing and registration from track to track are relatively easy to obtain since the number of code bits is not unduly large and the circumferential dimension of individual code bits is still sufficiently large to render them readily discernible with the naked eye. However, successive code tracks become progressively more difficult to manufacture and inspect because of the minuteness of their code bits (the code elements of the 16th and 17th code tracks generally can be distinguished only under a high-power microscope). In the light of the foregoing facts, I have deemed it desirable to limit the concentric code tracks on a code wheel to a number wherein the outermost track has code elements of a size which may be made conveniently to a desired accuracy but to provide means for augmenting the codes on the code wheel so as to provide a digital output wherein the number of digits is much greater than the number of code tracks on the code wheel.

Therefore, a more specific object of the present invention is to have a shaft encoder which is capable of producing a binary digital output of $n$ digits, with the encoder having a code wheel with code tracks totaling a number less than $n$. This objective is attained by using a code disc with a given number of concentric code tracks and providing in association with the code disc a stator plate having portions of successive concentric code tracks; also provided are means which cooperate with the code disc and the stator plate to provide an electrical output representative of a digital word made up of code bits equal in number to the number of concentric code tracks presented by the code disc and the aforesaid stator plate.

Other objects and many of the attendant advantages of the present invention will become more readily understood as reference is had to the following detailed specification when considered together with the accompanying drawings wherein.

Figure 1:
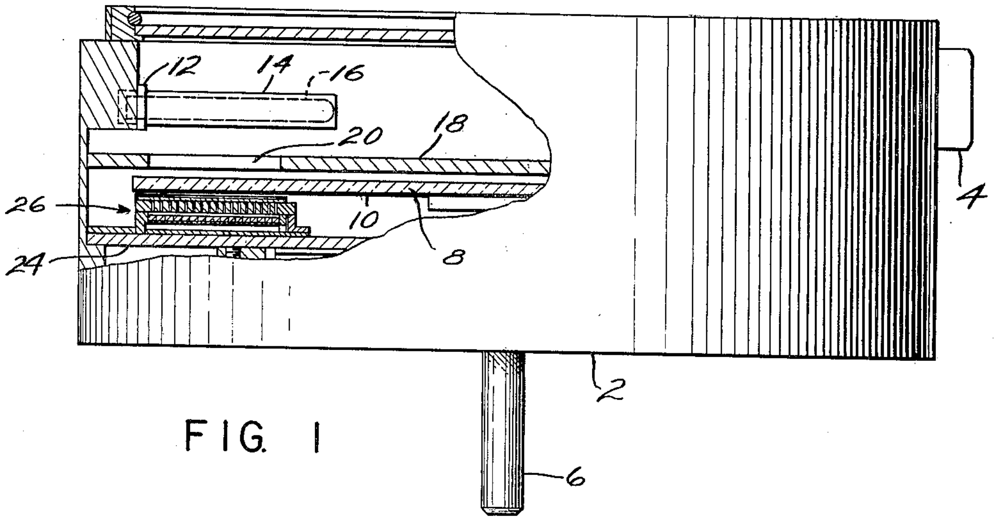
FIG. 1 is an elevational view of an encoder embodying the present invention, with parts thereof shown in section.

Turning now to FIG. 1, there is shown an optical shaft encoder embodying the present invention. The encoder of FIG. 1 comprises a housing 2 provided with a terminal connector 4 which is used to couple power to the unit and to couple the digital output to an auxiliary computer. Journaled within the housing is a rotatable shaft 6 which is adapted to be coupled to a rotary element whose angular position is to be determined. The encoder shaft 6 carries a code wheel or disc 8 which is preferably formed of a high quality glass and is provided on its underside with an opaque coating 10 which, by photographic processes of known character, has been provided with equally spaced optical code tracks comprising alternate light and dark segments. Plugged into a suitable connector 12 mounted in the side wall of housing 2 is a stroboscopic light module 14 which includes a lamp 16. Lamp 16 is pulsed by conventional means (not shown) in response to readout command signals.

Figure 2:
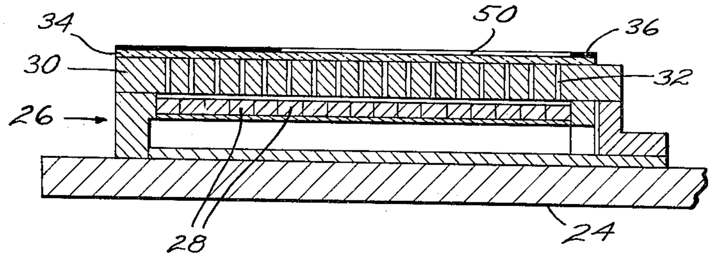
FIG. 2 is an enlargement of a portion of FIG. 1.
Figure 3:
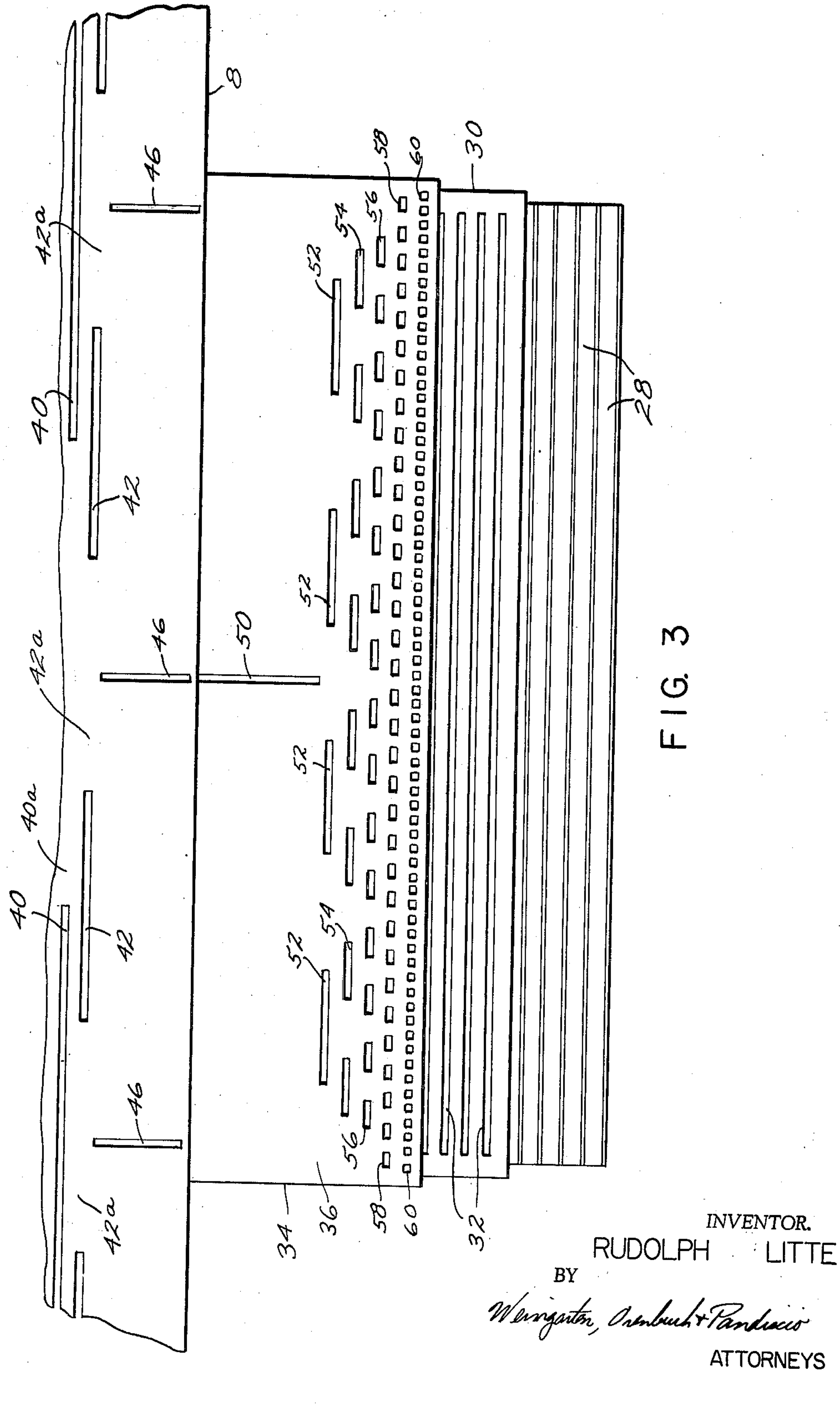
FIG. 3 is a fragmentary perspective view of the code wheel, stator plate, station separator, and photocell assembly of the encoder.

Attached to the inner wall of housing 2 is a cylindrical plate 18 interposed between the code wheel 8 and the lamp 16. The disc 18 is provided with a narrow radial slit 20. Also supported within housing 2 is a second plate 24 which supports a sub-assembly identified generally at 26 which for convenience may be identified as the optics-photocell assembly. As seen in FIGS. 2 and 3, this assembly comprises a plurality of elongated photocells 28 aligned in a common plane parallel to the code wheel 8. Photocells 28 are disposed along a common radius and are spaced so as to be in registration with individual code tracks on the code wheel 8 and on the stator plate hereinafter described. The electrical connections to the individual photocells are omitted for purposes of clarity. However, it is to be understood that photocells 28 may be of any convenient design and, for example, may be phototransistors or depositions of photoconductive material on a suitable base plate with appropriate electrical connections thereto. Obviously, the number of photocells will vary with the number of code bits to be detected. In the embodiment illustrated in the drawings (see FIG. 2), the number of photocells is 17, thereby making possible a 17-bit binary output.

Mounted above the photocells in parallel spaced relation thereto is an opaque station separator plate 30, preferably made of metal. This plate has a plurality of elongated holes 32, each having a radial dimension less than the corresponding dimension of photocells 28. Holes 32 are spaced so that each one is in registration with a different one of the photocells 28. Each hole 32 is aligned as close as possible to the center of its corresponding photocell. Supported on separator plate 30 is a stator plate 34 formed of high quality glass and provided on its upper surface with an opaque photographic coating 36 which, by appropriate processing, is made to have discrete light transmitting code elements thereon which are described in detail hereinafter.

In accordance with the present invention, the number of code tracks on code wheel 8 is less than the total number of photocells in the optics-photocell assembly 26. In the illustrated embodiment, code wheel 8 has twelve concentric binary code tracks, only the eleventh and twelfth of which are illustrated in part (FIG. 3). The eleventh code track comprises a series of evenly spaced, light transmitting areas 40 of equal length, and the twelfth code track comprises a series of evenly spaced, light transmitting areas 42. It is to be understood that these transparent areas are code elements, as are intervening equally spaced opaque areas 40*a* and 42*a*. The latter are identical in lengths to areas 40 and 42, respectively. As is to be expected, the number of code elements in the twelfth track is twice the number of the code elements in the eleventh track; and in the same fashion, the number of code elements in the eleventh track is twice the number of code elements in the tenth track, and so forth, back to the first track. The twelfth track is spaced from the periphery of the code wheel by an amount sufficient to accommodate a series of radially extending, transparent index elements 46 whose length is at least equal to the overall radial distance occupied by five of the equally spaced concentric code tracks on code wheel 8. These index elements occur with the same frequency as the light transmitting areas 42 and are in registration with the center lines of the opaque code elements 42*a* of the twelfth track, i.e., half way between the adjacent ends of successive light transmitting code elements 42.

As indicated previously, stator plate 34 has a series of transparent code elements formed in its photographic coating 36. These code elements are substantially as illustrated in FIG. 3. In FIG. 3, disc 8, stator 34, separator plate 30 and photocells 28 are shown in disassembled relation, displaced from each other out of operative registration in order to illustrate their interrelationships. It will be observed that each of slits 46 of disc 8, in operation, is in registration with tracks 52, 54, 56, 58 and 60 of stator 34 in such a way as to be capable of transmitting light projected through these tracks. Also, slit 50 is capable of transmitting light which is projected through the code tracks of disc 8. The arrangement is such, as will be apparent to persons skilled in the art, that at appropriate intervals when one of slits 46 and slit 50 is aligned, particular increments of the tracks on disc 8 and particular increments of the tracks on stator 34 are aligned with slits 46 and 50 and, in turn, with photocell 28 in such a way as to enable digital readout through conventional circuitry. As observed in this figure, the stator plate 34 has a radial transparent index element 50. Only a portion of index element 50 is visible in FIG. 3. However, it is to be understood that it extends from a point in line with the inner edge of the code wheel's first code track to a point in line with the outer edge of its twelfth code track. Stator plate 34 also has additional transparent code elements in a pattern corresponding to portions of the thirteenth to seventeenth code tracks normally used in a 17-bit encoder. These additional code elements are shown in FIG. 3 at 52–60. Code elements 52 occur at a frequency double the frequency rate of the code elements 42, thereby qualifying as the thirteenth code track. The additional groups of code segments 54, 56, 58, and 60 correspond in frequency to code elements of the fourteenth to seventeenth code tracks. The single radial index element 50 is located between successive code elements 52, in the same way that the index elements 46 are located between adjacent code elements 42.

The fine concentric code track segments on stator 34 are located at progressively greater radii than the twelve code tracks on code wheel 8, with each track segment in registration with a different one of the photocells 28 and the holes 32. The radial dimension, i.e., width, of each hole 32 is no greater and preferably is smaller than the corresponding dimension of the binary code elements of the associated code track or code track segment on code wheel 8 or stator 34, respectively. However, the circumferential dimension, i.e., length, of holes 32 is much larger, extending over a distance at least equal to and preferably greater than the distance between successive index elements 46. Holes 32 are arranged symmetrically with respect to the index element 50. The corresponding circumferential dimension of photocells 28 is at least as great as that of holes 32, as also is the corresponding dimension of radial slit 20 in plate 18. The foregoing arrangement offsets any light modulation caused by index elements 46 as a function of their movement through the light beam passed by slit 20, whereby any light modulation which occurs substantially is due solely to the on-off shutter action that results from movement of index elements 46 along the code elements 52–60.

In practice, the code wheel is coupled to a rotating member and the light source is pulsed at appropriate times to cause the photocells 28 to generate a 17-bit output signal representative of the instantaneous position of the shaft. When the light source is pulsed, the resulting beam will pass through the slit 20 and illuminate a photocell at each point where a code element, an index element, and a hole 32 are aligned. Light directed at photocells 1 to 12 will be modulated by movement of code elements on code wheel 8 past the stator plate index element 50 while light directed at photocells 13 to 17 will be modulated by movement of index elements 46 on code wheel 8 relative to the stator plate code elements 52, 54, 56, 58, and 60. Since the code track segments on stator plate 34 are identical in code element frequency to the thirteenth to seventeenth code tracks of a conventional 17-track optical encoder, and since the movement of index elements 46 past the stator plate code tracks is the same functionally as the movement of the twelve code wheel code tracks past index element 50, the output signals of the several photocells together will constitute a 17-bit binary code word indicative of the instantaneous angular position of the coupled shaft.

It is believed to be apparent that the resolution of the above-described encoder is fully the same as the resolution of a conventional direct reading encoder having seventeen concentric code tracks on its code wheel. On the other hand, it is much less difficult and costly to make since the code wheel 8 has only twelve complete binary code tracks. The time and cost of manufacturing a stator plate with only short segments of the 13th-bit to 17th-bit code tracks thereon is substantially less than the time and cost required to provide complete code tracks of the same frequencies on code wheel 8. Moreover, there is less likelihood of error in manufacture of the code wheel since fewer tracks are required to be made and inspected. Elimination of the more minute code elements characteristic of the 13th- to 17-bit code tracks also renders the problem of registration less severe since registration becomes more difficult to achieve with each additional binary track. While the stator plate must be manufactured to very close tolerances, the likelihood of error is minimized because only a small portion of each of the thirteenth to seventeenth tracks is required to be made. Correction of errors in a stator plate are far easier to correct than errors in the code disc. Moreover, if the errors are of a type which cannot be corrected, the financial loss involved in discarding a stator plate is far less than that involved in discarding an entire code wheel.

It is to be understood that the essence of this invention is to provide an encoder with a multi-signal output representative of *n* binary digits where a selected number of said digit signals are produced by a first group A of binary codes located on a code wheel and the remaining digit signals are produced by a second group B of binary codes located on a stator plate. Therefore, although the illustrated embodiment involves twelve code tracks on code wheel 8, and segments of the thirteenth to seventeenth code tracks on the stator plate 34, the number of code tracks on both the code wheel and stator plate may be varied considerably. Thus, for example, it may be desirable to manufacture an encoder where the code wheel has only eight code tracks but additional code tracks are provided on the stator plate. The number of code tracks on the code wheel and the stator plate need not total 17 but may be more or less, as desired. It is contemplated also that the code tracks need not be evenly spaced from each other; nor need the code elements have the same width, i.e., same radial dimension. The essential thing is that the code tracks, photocells, and the holes in the intervening separator plate 30 be aligned so as to obtain good discrimination without any conflicting "cross-talk." It is to be understood also that the code tracks need not be restricted to a particular form of binary code but may be based on a pure binary code, a reflected binary code, a binary coded decimal code, etc.

Although their waveforms are not shown, it is believed obvious that each of the parallel output signals of photocells 28 is substantially a square wave and will vary between a first amplitude level when its related photocell is receiving light and a second amplitude level when its related photocell is blocked off from light. These output signals are applied to amplifying and pulse-shaping circuits (not shown) which cause them to have sufficient amplitude and definition to operate transistor or vacuum tube computer and/or translator circuits.

It is to be understood that the location (but not the spacing and frequency) of index elements 46 is arbitrary and that as a group they may be shifted circumferentially on code wheel 8 provided the stator plate code elements 52-60 are shifted correspondingly relative to the stator plate index element 50. Thus, for example, index elements 46 could be aligned with the centers or the leading or trailing edges of code elements 42, provided that code elements 52–60 are shifted in the same way.

It is to be understood also that the shape of holes 32 in the station separator plate 30 is determined by the shape of the code elements on code wheel 8 and stator plate 34. Thus, if the code elements are made to have a relatively long radial dimension so that the code elements in the higher code tracks, e.g., tracks 13–17, appear as thin, radially extending lines, the holes 32 might be almost square and it is conceivable that they might even be round.

Also to be understood is the fact that the lamp need not be pulsed but may be operated continuously, in which case the output of each photocell would be fed to a suitable D.C. amplifier instead of an A.C. amplifier. The manner of operating the lamp has no bearing on the invention.

Obviously, many other modifications and variations of the present invention are possible in the light of the above teachings. It is to be understood, therefore, that the invention is not limited in its application to the details of construction and arrangement of parts specifically described or illustrated, and that within the scope of the appended claims, it may be practiced otherwise than as specifically described or illustrated.

I claim:

1. An encoder for converting analog information, in the form of the relative positions of two parts, to digital information, in the form of discrete representations, said encoder comprising first code means operatively connected to one of said parts, second code means operatively connected to the other of said parts, said first code means including at least one sequence of alternately clear and opaque increments, said second code means including at least one sequence of alternately clear and opaque increments, said first sequence having associated therewith a first index slit, said second sequence having associated therewith a second index slit, said first index slit being registered with said second sequence, said second index slit being registered with said first sequence, a source of illumination and a plurality of photocells, said first sequence and said second sequence being positioned in such a way as to direct light from said source of illumination, said first slit and clear increments of said second sequence to one of said plurality of photocells and to direct light from said source of illumination, said second slit and clear increments of said first sequence to another of said photocells, whereby said one of said photocells and said other of said photocells provide said discrete representations of digital information, the number of said plurality of photodetectors being greater than the number of said at least one sequence of said first code means.

2. An encoder comprising a housing, a stator mounted in fixed position in said housing, a rotor mounted for rotation in said housing, said stator being in the form of a thin glass disc, said rotor being in the form of a thin glass disc, said thin glass disc of said stator having on one face thereof a photographic emulsion presenting a plurality of concentric code tracks each including a sequence of clear and opaque increments, said glass disc of said rotor having at one of its faces a photographic emulsion presenting a plurality of concentric code tracks about the axis of rotation of said rotor, each of the last-mentioned code tracks having a sequence of alternating clear and opaque increments, said photographic emulsion of said stator providing a slit, said photographic emulsion of said rotor providing a series of equidistantly spaced slits, said series of equidistantly spaced slits being at least equal in number to the number of clear increments, opaque increment cycles of the outermost track of said rotor, said slit of said stator being in registration with all of said tracks of said rotor, said slits of said rotor being capable of registration with all of the tracks of said stator, a source of illumination on one side of said stator and said rotor, and a sequence of photocells on the other side of said stator and said rotor, certain of said photocells being in registration with said tracks of said stator and others of said photocells being in registration with said tracks of said rotor, the number of said photocells being greater than the number of said tracks of said rotor.

References Cited by the Examiner

UNITED STATES PATENTS 2,930,033 3/60 Webb ---------------- 340—347

MALCOLM A. MORRISON, *Primary Examiner.*